United States Patent
Kubota et al.

(10) Patent No.: US 11,962,190 B2
(45) Date of Patent: Apr. 16, 2024

(54) ROTOR OF ROTARY ELECTRIC MACHINE

(71) Applicant: HONDA MOTOR CO., LTD., Tokyo (JP)

(72) Inventors: Yoshihisa Kubota, Saitama (JP); Tatsuya Ohzu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 491 days.

(21) Appl. No.: 17/280,748

(22) PCT Filed: Sep. 26, 2019

(86) PCT No.: PCT/JP2019/037982
§ 371 (c)(1),
(2) Date: Mar. 26, 2021

(87) PCT Pub. No.: WO2020/067348
PCT Pub. Date: Apr. 2, 2020

(65) Prior Publication Data
US 2022/0045566 A1 Feb. 10, 2022

(30) Foreign Application Priority Data
Sep. 28, 2018 (JP) .............................. 2018-185521

(51) Int. Cl.
*H02K 1/27* (2022.01)
*H02K 1/276* (2022.01)
*H02K 1/32* (2006.01)

(52) U.S. Cl.
CPC ............. *H02K 1/2766* (2013.01); *H02K 1/32* (2013.01)

(58) Field of Classification Search
CPC .... H02K 1/2766; H02K 1/32; H02K 2213/03; Y02T 10/64
See application file for complete search history.

(56) References Cited

U.S. PATENT DOCUMENTS

| 8,760,025 B2 | 6/2014 | Rahman et al. |
| 10,666,101 B2 * | 5/2020 | Kaneshige ........... H02K 1/2766 |

(Continued)

FOREIGN PATENT DOCUMENTS

| CN | 103339831 A | 10/2013 |
| CN | 105830308 A | 8/2016 |

(Continued)

OTHER PUBLICATIONS

Dec. 10, 2019, International Search Report issued for related PCT Application No. PCT/JP2019/037982.

(Continued)

*Primary Examiner* — Naishadh N Desai
(74) *Attorney, Agent, or Firm* — Paratus Law Group, PLLC

(57) ABSTRACT

A rotor of a rotary electric machine includes a rotor core and a magnetic pole portion. The magnetic pole portion includes a magnet portion having at least two layers along a radial direction, which has an outer diameter side magnet portion including an outer diameter side arc magnet and an inner diameter side magnet portion including a pair of inner diameter side arc magnets arranged with a d-axis interposed. In addition, a pair of ribs extending in the radial direction are respectively provided between d-axis side end surfaces of the pair of inner diameter side arc magnets and the d-axis. A gap portion is provided between the pair of ribs to overlap the d-axis.

6 Claims, 2 Drawing Sheets

(56) References Cited

U.S. PATENT DOCUMENTS

| | | | |
|---|---|---|---|
| 2002/0041127 A1 | 4/2002 | Naito et al. | |
| 2003/0102755 A1* | 6/2003 | Naito | H02K 1/2766 310/156.56 |
| 2007/0052313 A1* | 3/2007 | Takahashi | H02K 1/2766 310/156.53 |
| 2010/0007232 A1* | 1/2010 | Komuro | H02K 1/02 310/156.01 |
| 2013/0307363 A1 | 11/2013 | Sano et al. | |
| 2016/0261158 A1* | 9/2016 | Horii | H02K 1/32 |
| 2016/0380492 A1 | 12/2016 | Kawasaki et al. | |
| 2017/0033624 A1* | 2/2017 | Kikuchi | B60L 15/007 |
| 2017/0317540 A1* | 11/2017 | Laldin | H02K 1/2706 |
| 2018/0248428 A1 | 8/2018 | Nigo et al. | |
| 2018/0269734 A1 | 9/2018 | Soma et al. | |

FOREIGN PATENT DOCUMENTS

| | | | |
|---|---|---|---|
| JP | H09-233744 A | 9/1997 | |
| JP | 2002-078259 A | 3/2002 | |
| JP | 2006-314152 A | 11/2006 | |
| JP | 2009-044893 A | 2/2009 | |
| JP | 2010-022147 A | 1/2010 | |
| JP | 2014-075892 A | 4/2014 | |
| JP | 2015-126646 A | 7/2015 | |
| JP | 2018-153047 A | 9/2018 | |
| JP | 2019165592 A * | 9/2019 | H02K 1/16 |
| WO | WO 2015/104956 A1 | 7/2015 | |
| WO | WO 2017/077580 A1 | 5/2017 | |

OTHER PUBLICATIONS

Dec. 10, 2019, International Search Opinion issued for related PCT Application No. PCT/JP2019/037982.
Oct. 4, 2022, Japanese Office Action issued for related JP Application No. 2020-549387.
May 10, 2022, Japanese Office Action issued for related JP Application No. 2020-549387.
Jul. 28, 2023, translation of Chinese Office Action issued for related CN Application No. 201980062803.0.

* cited by examiner

ROTOR OF ROTARY ELECTRIC MACHINE

CROSS REFERENCE TO PRIOR APPLICATION

This application is a National Stage Patent Application of PCT International Patent Application No. PCT/JP2019/037982 (filed on Sep. 26, 2019) under 35 U.S.C. § 371, which claims priority to Japanese Patent Application No. 2018-185521 (filed on Sep. 28, 2018), which are all hereby incorporated by reference in their entirety.

TECHNICAL FIELD

The present invention relates to a rotor of a rotary electric machine mounted on an electric vehicle or the like, and more particularly to a rotor of a rotary electric machine provided with a plurality of arc magnets.

BACKGROUND ART

In a recent year, a rotor, which a plurality of permanent magnets are arranged in a rotor core at predetermined intervals in a circumferential direction, is known as a rotor used in a rotary electric machine. Some of such rotors of rotary electric machines have a magnetic pole portion where an arc magnet located on an outer diameter side of a rotor and an arc magnet located on an inner diameter side of the rotor are arranged in two layers at intervals. For example, Patent Literature 1 discloses a rotor of a rotary electric machine having a magnetic pole portion, which an arc magnet located on an outer diameter side of a rotor and an arc magnet located on an inner diameter side of the rotor have substantially the same plate thickness and are arranged in substantially concentric circles. In the rotor of the rotary electric machine of Patent Literature 1, since the arc magnets are arranged in two layers in a radial direction, an amount of magnets is increased compared to a rotor which arc magnets are arranged in only one layer. As a result, a magnet torque can be increased.

CITATION LIST

Patent Literature

Patent Literature 1: JP-A-H09-233744

SUMMARY OF INVENTION

Technical Problem

However, in the rotor of the rotary electric machine of Patent Literature 1, a difference between a d-axis inductance and a q-axis inductance could not be increased, and thus a reluctance torque could not be effectively used.

The present invention provides a rotor of a rotary electric machine capable of effectively utilizing the reluctance torque while increasing the magnet torque.

Solution to Problem

According to the present invention, there is a rotor of a rotary electric machine including:
a rotor core;
a plurality of magnetic pole portions arranged along a circumferential direction, and a plurality of arc magnets forming the magnetic pole portions, in which:
each of the magnetic pole portions has a magnet portion having at least two layers along a radial direction;
the magnet portion includes,
an outer diameter side magnet portion including at least one of the arc magnets arranged to be convex inward in the radial direction, and
an inner diameter side magnet portion including at least a pair of the arc magnets arranged to be convex inward in the radial direction; and
each of the arc magnets has a same arc center on an inner peripheral surface and an outer peripheral surface;
plate thicknesses of the arc magnets are larger in the inner diameter side magnet portion than in the outer diameter side magnet portion;
radiuses of the arc magnets are larger at the inner diameter side magnet portion than at the outer diameter side magnet portion; and
when a central axis of each of the magnetic pole portions is set as a d-axis and an axis away from the d-axis by an electrical angle of 90° is set as a q-axis,
the pair of the arc magnets of the inner diameter side magnet portion are arranged to interpose the d-axis,
a pair of ribs extending in the radial direction are respectively provided between d-axis side end surfaces of the pair of the arc magnets of the inner diameter side magnet portion and the d-axis, and
a gap portion is provided between the pair of ribs to overlap the d-axis.

Advantageous Effects of Invention

According to the present invention, the d-axis inductance can be reduced by the gap portion provided to overlap the d-axis while increasing the magnet torque, and thus the reluctance torque can be effectively used.

DESCRIPTION OF EMBODIMENTS

Hereinafter, an embodiment of a rotor of a rotary electric machine of the present invention will be described with reference to the accompanying drawings.

Figure 1:
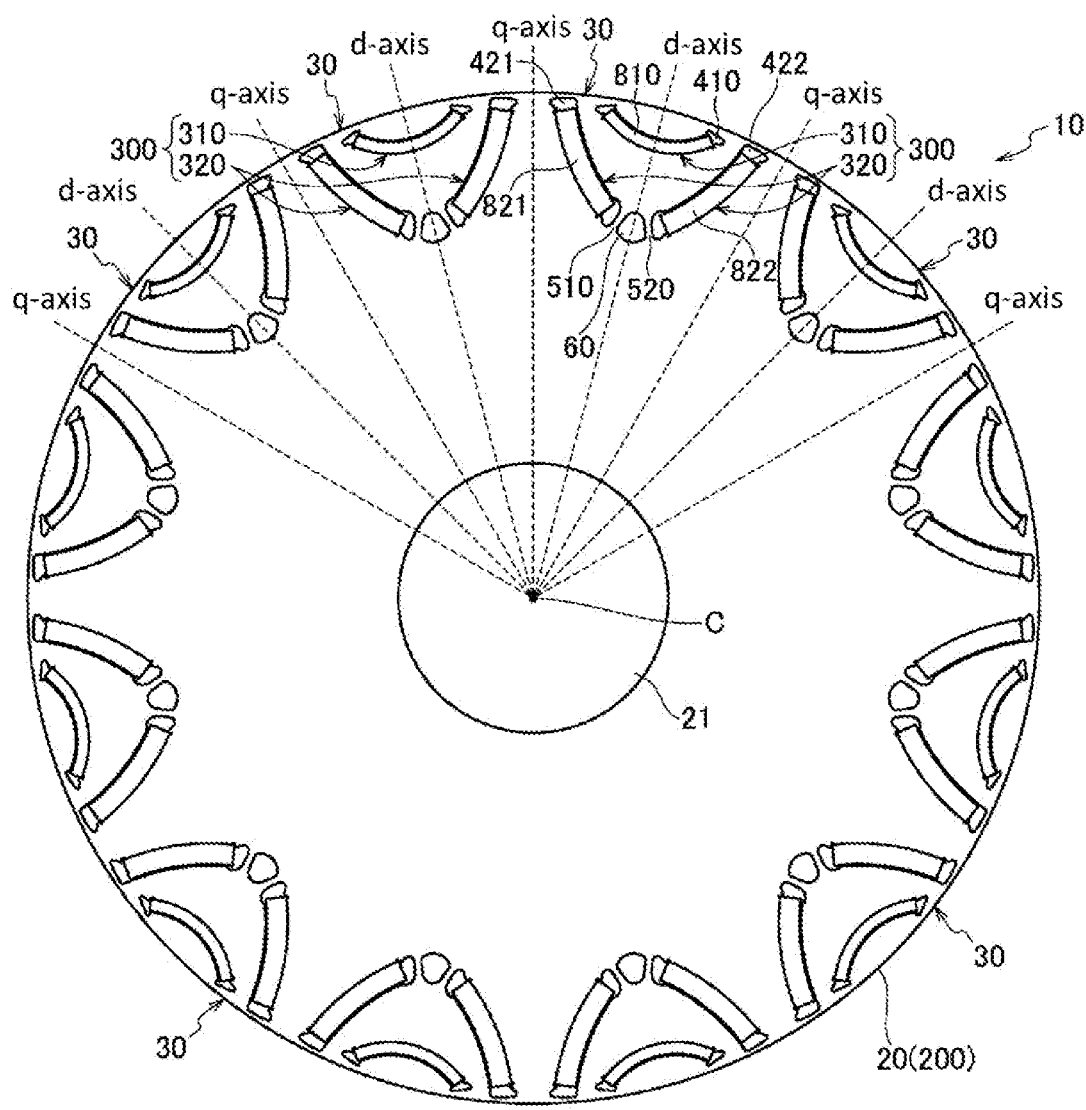
FIG. 1 is a front view of a rotor of a rotary electric machine according to a first embodiment of the present invention.

As illustrated in FIG. 1, a rotor 10 of a rotary electric machine of the embodiment includes a rotor core 20 attached to an outer peripheral portion of a rotor shaft (not illustrated) and a plurality of (twelve in this embodiment) magnetic pole portions 30 formed inside the rotor core 20 at predetermined intervals in a circumferential direction. The rotor 10 is arranged on an inner peripheral side of a stator (not illustrated).

The rotor core 20 is formed by laminating a plurality of substantially annular electromagnetic steel sheets 200 having the same shape in an axial direction. The rotor core 20 has a rotor shaft hole 21 at the same center as a circular center C. Furthermore, when a central axis of each magnetic pole portion 30 connecting the circular center C and a center of each magnetic pole portion 30 is set as a d-axis (d-axis in the drawing) and an axis away from the d-axis by the electrical angle of 90° is set as a q-axis (q-axis in the drawing), the rotor core 20 includes an outer diameter side magnet insertion hole 410 formed to cross the d-axis on an outer diameter side of the rotor core 20 so as to correspond to each magnetic pole portion 30, a pair of inner diameter side magnet insertion holes 421 and 422 formed in a substantially V-shape extending outward in a radial direction with the d-axis interposed on an inner diameter side of the outer diameter side magnet insertion hole 410, a pair of ribs 510 and 520 formed at d-axis side ends of the inner diameter side magnet insertion holes 421 and 422 and respectively extending in the radial direction, and a gap portion 60 formed between the pair of ribs 510 and 520. The outer diameter side magnet insertion hole 410 and the inner diameter side magnet insertion holes 421 and 422 both have an arc shape which is convex inward in the radial direction.

Each magnetic pole portion 30 has a magnet portion 300 including an outer diameter side magnet portion 310 and an inner diameter side magnet portion 320. The outer diameter side magnet portion 310 includes an outer diameter side arc magnet 810 which is inserted into the outer diameter side magnet insertion hole 410 and arranged to be convex inward in the radial direction. The inner diameter side magnet portion 320 includes a pair of inner diameter side arc magnets 821 and 822 which are respectively inserted into the pair of inner diameter side magnet insertion holes 421 and 422 and arranged to be convex inward in the radial direction.

The outer diameter side arc magnet 810 and the pair of inner diameter side arc magnets 821 and 822 are magnetized in the radial direction. Further, the outer diameter side arc magnet 810 and the pair of inner diameter side arc magnets 821 and 822 are arranged so that a magnetization direction is different from that of the adjacent magnetic pole portion 30, and the magnetic pole portions 30 are arranged so that the magnetization directions are alternately different in a circumferential direction.

Here, in a front view of the rotor 10, when the circular center C is viewed as downward, and the outer diameter side in the d-axis direction is viewed as upward, the pair of inner diameter side magnet insertion holes 421 and 422 have a first inner diameter side magnet insertion hole 421 on a left side and a second inner diameter side magnet insertion hole 422 on a right side with respect to the d-axis, and the pair of ribs 510 and 520 has a first rib 510 on the left side and a second rib 520 on the right side with the d-axis interposed, and further, the pair of inner diameter side arc magnets 821 and 822 have a first inner diameter side arc magnet 821 on the left side and a second inner diameter side arc magnet 822 on the right side with the d-axis interposed.

Figure 2:
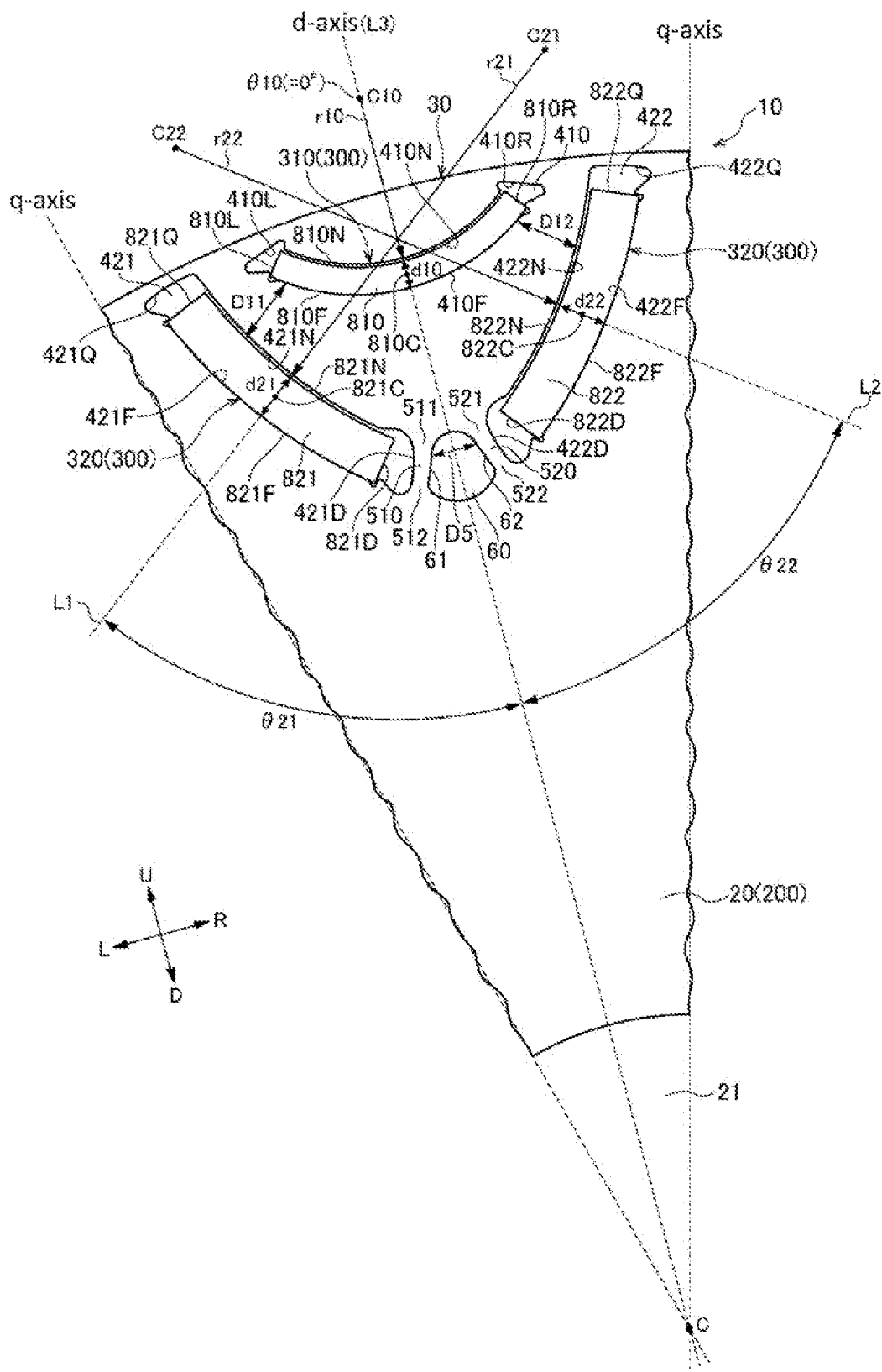
FIG. 2 is an enlarged view of a periphery of a magnetic pole portion of the rotor of the rotary electric machine of FIG. 1.

Hereinafter, in the present specification and the like, in order to simplify and clarify the explanation, the circular center C is defined as a lower side and the outer diameter side in the d-axis direction is defined as an upper side in the front view of the rotor 10. In FIG. 2, an upper side of the rotor 10 is illustrated as U, a lower side is illustrated as D, a left side is illustrated as L, and a right side is illustrated as R.

As illustrated in FIG. 2, the outer diameter side arc magnet 810 has an inner peripheral surface 810N and an outer peripheral surface 810F having the same arc center C10, a left end surface 810L, and a right end surface 810R. The first inner diameter side arc magnet 821 has an inner peripheral surface 821N and an outer peripheral surface 821F having the same arc center C21, a q-axis side end surface 821Q, and a d-axis side end surface 821D. The arc center C21 of the first inner diameter side arc magnet 821 is located on the right side opposite to the first inner diameter side arc magnet 821 with respect to the d-axis. The second inner diameter side arc magnet 822 has an inner peripheral surface 822N and an outer peripheral surface 822F having the same arc center C22, a q-axis side end surface 822Q, and a d-axis side end surface 822D. The arc center C22 of the second inner diameter side arc magnet 822 is located on the left side opposite to the second inner diameter side arc magnet 822 with respect to the d-axis.

As the outer diameter side arc magnet 810, the first inner diameter side arc magnet 821, and the second inner diameter side arc magnet 822, for example, an arc magnet obtained by cutting a ring-shaped magnet formed by molding using a hot working process in the radial direction can be used.

Generally, when a ring-shaped magnet is formed by molding using a hot working process such as hot extrusion molding, by hot extrusion molding, a radial compressive stress acts on a randomly oriented crystal group of the ring-shaped magnet material, and the crystal group of the ring-shaped magnet material is oriented in the same direction as a compressive stress direction. As a result, an anisotropic ring-shaped magnet oriented in the radial direction is obtained.

Therefore, in order to obtain a ring-shaped magnet having high-performance magnetization characteristics, it is desirable that the stress acting on the crystal group of the ring-shaped magnet material becomes uniform over the entire area. However, when a ring radius of the ring-shaped magnet material is small and a thickness of the ring-shaped magnet material is large, the stress acting on the crystal group of the ring-shaped magnet material becomes non-uniform, and thus a degree of orientation of the ring-shaped magnet decreases. Further, even when the thickness of the ring-shaped magnet material is non-uniform, the stress acting on the crystal group of the ring-shaped magnet material becomes non-uniform, and thus the degree of orientation of the ring-shaped magnet decreases. Therefore, in order for the stress acting on the crystal group of the ring-shaped magnet material to be uniform over the entire area, a value of (thickness of the ring-shaped magnet material)/(ring radius of the ring-shaped magnet material) must be within a predetermined range. In addition, when increasing a magnet amount of the arc magnets, in order to arrange the arc magnets with high-performance magnetization characteristics in a plurality of layers, it is necessary to increase the arc radius of the arc magnets according to a plate thickness.

A plate thickness d21 of the first inner diameter side arc magnet 821 and a plate thickness d22 of the second inner diameter side arc magnet 822 are larger than a plate thickness d10 of the outer diameter side arc magnet 810. As a result, the amount of magnets of the first inner diameter side arc magnet 821 and the second inner diameter side arc magnet 822 can be increased and a magnet torque of the rotary electric machine can be increased. As a result, output performance of the rotary electric machine can be improved.

Also, by increasing the plate thickness d21 of the first inner diameter side arc magnet 821 and the plate thickness d22 of the second inner diameter side arc magnet 822, an arc radius r21 of the inner peripheral surface 821N of the first inner diameter side arc magnet 821 and an arc radius r22 of the inner peripheral surface 822N of the second inner diameter side arc magnet 822 are larger than an arc radius r10 of the inner peripheral surface 810N of the outer diameter side arc magnet 810. As a result, the outer diameter side arc magnet 810, the first inner diameter side arc magnet 821, and the second inner diameter side arc magnet 822, which have high-performance magnetization characteristics, can be used, so that the output performance of the rotary electric machine can be improved.

Here, it is preferable that d10/r10 which is the ratio of the arc radius r10 of the inner peripheral surface 810N of the outer diameter side arc magnet 810 to the plate thickness d10 of the outer diameter side arc magnet 810, d21/r21 which is the ratio of the arc radius r21 of the inner peripheral surface 821N of the first inner diameter side arc magnet 821 to the plate thickness d21 of the first inner diameter side arc magnet 821, and d22/r22 which is the ratio of the arc radius r22 of the inner peripheral surface 822N of the second inner diameter side arc magnet 822 to the plate thickness d22 of the second inner diameter side arc magnet 822 have substantially the same value within a predetermined range. More preferably, the arc radius r21 of the inner peripheral surface 821N of the first inner diameter side arc magnet 821 and the arc radius r22 of the inner peripheral surface 822N of the second inner diameter side arc magnet 822 are the same and the plate thickness d21 of the first inner diameter side arc magnet 821 and the plate thickness d22 of the second inner diameter side arc magnet 822 are the same, and further the first inner diameter side arc magnet 821 and the second inner diameter side arc magnet 822 have the same shape.

In addition, a distance D11 between the first inner diameter side arc magnet 821 and the outer diameter side arc magnet 810 and a distance D12 between the second inner diameter side arc magnet 822 and the outer diameter side arc magnet 810 both become longer as they approach the d-axis from the q-axis.

As a result, it is possible to suppress a circumferential length of the magnetic pole portion 30 from becoming large, and thus it is possible to suppress the size of the rotor 10 from becoming large. Therefore, when increasing the amount of magnets in the first inner diameter side arc magnet 821 and the second inner diameter side arc magnet 822, for the rotor 10, it is possible to use the outer diameter side arc magnet 810, the first inner diameter side arc magnet 821, and the second inner diameter side arc magnet 822, which have high-performance magnetization characteristics while suppressing the increase in size. In addition, a magnetic path (hereinafter, also referred to as a q-axis magnetic path) along the q-axis in the rotor 10 can be widened and a reluctance torque of the rotary electric machine can be increased, so that the output performance of the rotary electric machine can be improved. Furthermore, the magnet magnetic flux due to the first inner diameter side arc magnet 821, the second inner diameter side arc magnet 822, and the outer diameter side arc magnet 810 is more likely to be concentrated on the d-axis, and thus the magnet torque of the rotary electric machine can be used efficiently. As a result, the output performance of the rotary electric machine can be improved.

An angle θ10 between a virtual line L3 connecting a central portion 810C of the outer diameter side arc magnet 810 and the arc center C10 of the outer diameter side arc magnet 810 and the d-axis is 0°. That is, the virtual line L3 coincides with the d-axis. As a result, the outer diameter side magnet portion 310 can include one arc magnet, and the outer diameter side magnet portion 310 can be formed symmetrically with respect to the d-axis. As a result, the magnet torque can be obtained efficiently with a simple structure.

Furthermore, an angle θ21 between a virtual line L1, which connects a central portion 821C of the first inner diameter side arc magnet 821 and the arc center C21 of the first inner diameter side arc magnet 821, and the d-axis is equal to an angle θ22 between a virtual line L2, which connects a central portion 822C of the second inner diameter side arc magnet 822 and the arc center C22 of the second inner diameter side arc magnet 822, and the d-axis. As a result, the inner diameter side magnet portion 320 can be formed symmetrically with respect to the d-axis, so that the arrangement can be made efficiently for obtaining the reluctance torque.

The outer diameter side magnet insertion hole 410 includes an inner peripheral wall surface 410N and an outer peripheral wall surface 410F formed along the inner peripheral surface 810N and the outer peripheral surface 810F of the outer diameter side arc magnet 810, a left side wall surface 410L and a right side wall surface 410R. The first inner diameter side magnet insertion hole 421 includes an inner peripheral wall surface 421N and an outer peripheral wall surface 421F formed along the inner peripheral surface 821N and the outer peripheral surface 821F of the first inner diameter side arc magnet 821, a q-axis side wall surface 421Q, and a d-axis side wall surface 421D. The second inner diameter side magnet insertion hole 422 includes an inner peripheral wall surface 422N and an outer peripheral wall surface 422F formed along the inner peripheral surface 822N and the outer peripheral surface 822F of the second inner diameter side arc magnet 822, a q-axis side wall surface 422Q, and a d-axis side wall surface 422D.

In addition, the first rib 510 extending in the radial direction is formed between the d-axis side end surface 821D of the first inner diameter side arc magnet 821 and the d-axis, and the second rib 520 extending in the radial direction is formed between the d-axis side end surface 822D of the second inner diameter side arc magnet 822 and the d-axis. In addition, there is the gap portion 60 between the first rib 510 and the second rib 520. Therefore, the gap portion 60 is provided so as to overlap the d-axis.

As a result, in the inner diameter side magnet portion 320, the d-axis has a gap, so that the d-axis inductance can be reduced. Therefore, since the difference between the d-axis inductance and the q-axis inductance can be increased, the reluctance torque can be effectively used. As a result, the output performance of the rotary electric machine can be improved.

The first rib 510 includes the d-axis side wall surface 421D of the first inner diameter side magnet insertion hole 421 and a left wall surface 61 of the gap portion 60. The second rib 520 includes the d-axis side wall surface 422D of the second inner diameter side magnet insertion hole 422 and a right wall surface 62 of the gap portion 60.

Therefore, a centrifugal load by the first inner diameter side arc magnet 821 is received by the first rib 510 and a centrifugal load by the second inner diameter side arc magnet 822 is received by the second rib 520. That is, the first rib 510 and the second rib 520 receive the centrifugal load by the first inner diameter side arc magnet 821 and the centrifugal load by the second inner diameter side arc magnet 822 separately. As a result, a bending stress generated in the rotor core 20 due to weight variation of the first inner diameter side arc magnet 821 and the second inner diameter side arc magnet 822 can be reduced.

Further, the first rib 510 and the second rib 520 are provided in a substantially inverted V-shape in which a distance D5 between the first rib 510 and the second rib 520 increases inward in the radial direction. Therefore, both a radial outer end portion 511 and a radial inner end portion 512 of the first rib 510 and both a radial outer end portion 521 and a radial inner end portion 522 of the second rib 520 can increase the angle R. As a result, the stress concentration on both end portions of the first rib 510 and the second rib 520 in the radial direction can be reduced.

Here, a refrigerant may be supplied to the gap portion 60. As a result, the refrigerant can be supplied in a vicinity of the outer diameter side arc magnet 810, the first inner diameter side arc magnet 821, and the second inner diameter side arc magnet 822. As a result, the outer diameter side arc magnet 810, the first inner diameter side arc magnet 821, and the second inner diameter side arc magnet 822 can be cooled more effectively.

The embodiment described above can be appropriately modified, improved, and the like.

In addition, at least the following matters are described in this specification. The components and the like corresponding to those of the embodiment described above are shown in parentheses, but the invention is not limited thereto.

(1) A rotor (rotor 10) of a rotary electric machine including:
- a rotor core (rotor core 20);
- a plurality of magnetic pole portions (magnetic pole portions 30) arranged along a circumferential direction; and
- a plurality of arc magnets (outer diameter side arc magnet 810, inner diameter side arc magnets 821 and 822) forming the magnetic pole portions, in which
- each of the magnetic pole portions has a magnet portion (magnet portion 300) having at least two layers along a radial direction;
- the magnet portion includes,
  - an outer diameter side magnet portion (outer diameter side magnet portion 310) including at least one of the arc magnets (outer diameter side arc magnet 810) arranged to be convex inward in the radial direction, and
  - an inner diameter side magnet portion (inner diameter side magnet portion 320) including at least a pair of the arc magnets (inner diameter side arc magnets 821 and 822) arranged to be convex inward in the radial direction; and
- when a central axis of each of the magnetic pole portions is set as a d-axis and an axis away from the d-axis by an electrical angle of 90° is set as a q-axis,
- the pair of the arc magnets of the inner diameter side magnet portion are arranged to interpose the d-axis,
- a pair of ribs (ribs 510 and 520) extending in the radial direction are respectively provided between d-axis side end surfaces (d-axis side end surfaces 821D and 822D) of the pair of the arc magnets of the inner diameter side magnet portion and the d-axis, and
- a gap portion (gap portion 60) is provided between the pair of ribs to overlap the d-axis.

According to (1), since each of magnetic pole portions has a magnet portion having at least two layers along the radial direction, the amount of magnets in each of the magnetic pole portions can be increased. As a result, the magnet torque of the rotary electric machine can be increased.

Furthermore, since the pair of ribs extending in the radial direction are respectively provided between the d-axis side end surfaces of the pair of arc magnets of the inner diameter side magnet portion and the d-axis, each of the ribs in the pair of ribs will separately receive a centrifugal load from each of the arc magnets in the pair of adjacent arc magnets. As a result, even when the amount of magnets in the inner diameter side magnet portion is increased, bending stress generated due to the weight variation in the pair of arc magnets can be reduced.

In addition, since the gap portion is provided between the pair of ribs to overlap the d-axis, a gap is provided on the d-axis at the inner diameter side magnet portion, so that the d-axis inductance can be reduced. As a result, a difference between the d-axis inductance and the q-axis inductance can be increased, so that the reluctance torque can be effectively used.

(2) The rotor of the rotary electric machine according to (1), where
- the pair of ribs are provided in a substantially inverted V-shape in which a distance (distance D5) between the pair of ribs increases inward in the radial direction.

According to (2), since the pair of ribs are provided in a substantially inverted V-shape in which the distance between the pair of ribs increases inward in the radial direction, the angle R can be increased at both end portions of each of the ribs in the radial direction. As a result, the stress concentration on both end portions of each of the ribs in the radial direction can be reduced.

(3) The rotor of the rotary electric machine according to (1) or (2), in which
- a refrigerant is supplied to the gap portion.

According to (3), since the refrigerant is supplied to the gap portion, the refrigerant can be supplied in the vicinity of the arc magnets. As a result, the arc magnets can be cooled more effectively.

(4) The rotor of the rotary electric machine according to any one of (1) to (3), where
- distances (distance D11, D12) between the arc magnets of the inner diameter side magnet portion and the arc magnets of the outer diameter side magnet portion increase as it approaches from the q-axis to the d-axis.

According to (4), the distances between the arc magnets of the inner diameter side magnet portion and the arc magnets of the outer diameter side magnet portion increase as it approaches from the q-axis to the d-axis. As a result, it is possible to suppress the circumferential length of the magnetic pole portion from becoming large, so that it is possible to suppress the size of the rotor from becoming large. Moreover, since a q-axis magnetic path can be widened, the reluctance torque of the rotary electric machine can be increased. Furthermore, since the magnet magnetic flux due to the arc magnet of the inner diameter side magnet portion and the arc magnet of the outer diameter side magnet portion can be easily concentrated on the d-axis, the magnet torque of the rotary electric machine can be efficiently used.

(5) The rotor of the rotary electric machine according to (4), in which:
- the pair of the arc magnets of the inner diameter side magnet portion includes,
  - a first arc magnet (first inner diameter side arc magnet 821) located on one side in the circumferential direction with respect to the d-axis, and
  - a second arc magnet (second inner diameter side arc magnet 822) located on another side in the circumferential direction with respect to the d-axis;
- an arc center (arc center C21) of the first arc magnet is located on the another side of the d-axis in the circumferential direction;
- an arc center (arc center C22) of the second arc magnet is located on the one side of the d-axis in the circumferential direction; and
- in front view of the rotor core, an angle (angle θ21) between a first virtual line (virtual line L1) and the d-axis is equal to an angle (angle θ22) between a second virtual line (virtual line L2) and the d-axis, the first virtual line connecting a central portion (central portion 821C) of the first arc magnet and the arc center of the first arc magnet, the second virtual line connecting a central portion (central portion 822C) of the second arc magnet and the arc center of the second arc magnet.

According to (5), the arc center of the first arc magnet and the arc center of the second arc magnet are both located on the opposite sides of the first arc magnet and the second arc magnet in the circumferential direction with respect to the d-axis, and the angle between the first virtual line and the d-axis is equal to the angle between the second virtual line and the d-axis, the first virtual line connecting the central portion of the first arc magnet and the arc center of the first arc magnet, the second virtual line connecting the central portion of the second arc magnet and the arc center of the second arc magnet. Therefore, the inner diameter side magnet portion can be formed symmetrically with respect to the d-axis, which can be an efficient arrangement for obtaining reluctance torque.

(6) The rotor of the rotary electric machine according to (5), in which in front view of the rotor core, when an angle (angle θ10) between a third virtual line (virtual line L3) and the d-axis is set as θ1 and an angle (angle θ21) between the first virtual line and the d-axis and an angle between the second virtual line and the d-axis (angle θ22) are set as θ2, θ1<θ2 is satisfied, the third virtual line connecting a central portion (central portion 810C) of the at least one arc magnet of the outer diameter side magnet portion and an arc center (arc center C10) of the at least one arc magnet of the outer diameter side magnet portion.

According to (6), the angle θ1 between the third virtual line and the d-axis and the angle θ2, which is the angle between the first virtual line and the d-axis and the angle between the second virtual line and the d-axis, satisfy θ1<θ2, the third virtual line connecting the central portion of the at least one arc magnet of the outer diameter side magnet portion and the arc center of the at least one arc magnet of the outer diameter side magnet portion. As a result, both the distance between the first arc magnet and the outer diameter side arc magnet and the distance between the second arc magnet and the outer diameter side arc magnet can be increased as it approaches from the q-axis to the d-axis.

(7) The rotor of the rotary electric machine according to (6), in which the at least one of the arc magnets of the outer diameter side magnet portion includes one arc magnet (outer diameter side arc magnet 810); and the θ1 is zero.

According to (7), since the outer diameter side magnet portion includes one arc magnet and θ1 is zero, the outer diameter side magnet portion is formed symmetrically with respect to the d-axis. As a result, magnet torque can be efficiently obtained with a simple structure.

(8) The rotor of the rotary electric machine according to any one of (1) to (7), in which:

each of the arc magnets has a same arc center (arc center C10, C21, C22) on an inner peripheral surface and an outer peripheral surface;

plate thicknesses (plate thickness d10, d21, d22) of the arc magnets are larger in the inner diameter side magnet portion than in the outer diameter side magnet portion; and arc radiuses (arc radius r10, r21, r22) of the arc magnets are larger at the inner diameter side magnet portion than at the outer diameter side magnet portion.

According to (8), the plate thicknesses and arc radiuses of the arc magnets are larger in the inner diameter side magnet portion than in the outer diameter side magnet portion. That is, the arc radiuses of the arc magnet can be increased by the amount of increase to the plate thickness of the arc magnet of the inner diameter side magnet portion from the plate thickness of the arc magnet of the outer diameter side magnet portion. Therefore, when increasing the amount of magnets in each of the magnetic pole portions, it is possible to use an arc magnet having high-performance magnetization characteristics, and thus the output performance of the rotary electric machine can be improved.

REFERENCE SIGNS LIST

10: rotor
20: rotor core
30: magnetic pole portion
300: magnet portion
310: outer diameter side magnet portion
320: inner diameter side magnet portion
510: rib (first rib)
520: rib (second rib)
60: gap portion
810: outer diameter side arc magnet
810C: central portion
821: first inner diameter side arc magnet (inner diameter side arc magnet)
821C: central portion
821D: d-axis side end surface
822: second inner diameter side arc magnet (inner diameter side arc magnet)
822C: central portion
822D: d-axis side end surface
C10, C21, C22: arc center
d10, d21, d22: plate thickness
r10, r21, r22: arc radius
D5, D11, D12: distance
L1: virtual line (first virtual line)
L2: virtual line (second virtual line)
L3: virtual line (third virtual line)
θ10: angle (θ1)
θ21, θ22: angle (θ2)

The invention claimed is:

1. A rotor of a rotary electric machine comprising:
a rotor core;
a plurality of magnetic pole portions arranged along a circumferential direction; and
a plurality of arc magnets forming the magnetic pole portions, wherein:
each of the magnetic pole portions has a magnet portion having at least two layers along a radial direction;
the magnet portion includes,
an outer diameter side magnet portion including at least one of the arc magnets arranged to be convex inward in the radial direction, and
an inner diameter side magnet portion including at least a pair of the arc magnets arranged to be convex inward in the radial direction; and
when a central axis of each of the magnetic pole portions is set as a d-axis and an axis away from the d-axis by an electrical angle of 90° is set as a q-axis,
the pair of the arc magnets of the inner diameter side magnet portion are arranged to interpose the d-axis,
a pair of ribs extending in the radial direction are respectively provided between d-axis side end surfaces of the pair of the arc magnets of the inner diameter side magnet portion and the d-axis, a gap portion is provided between the pair of ribs to overlap the d-axis, a distance between one of the arc magnets of the inner diameter side magnet portion and one of the arc magnets of the outer diameter side magnet portion, which is arranged on an opposite side of the one of the arc magnets of the inner diameter side magnet portion, increases from the q-axis toward the d-axis, the pair of the arc magnets of the inner diameter side magnet portion includes, a first arc magnet located on one side in the circumferential direction with respect to the d-axis, and a second arc magnet located on another side in the circumferential direction with respect to the d-axis;

an arc center of the first arc magnet is located on the another side of the d-axis in the circumferential direction;

an arc center of the second arc magnet is located on the one side of the d-axis in the circumferential direction; and in front view of the rotor core, an angle between a first virtual line and the d-axis is equal to an angle between a second virtual line and the d-axis, the first virtual line connecting a central portion of the first arc magnet and the arc center of the first arc magnet, the second virtual line connecting a central portion of the second arc magnet and the arc center of the second arc magnet.

2. The rotor of the rotary electric machine according to claim 1, wherein the pair of ribs are provided in a substantially inverted V-shape in which a distance between the pair of ribs increases inward in the radial direction.

3. The rotor of the rotary electric machine according to claim 1, wherein a refrigerant is supplied to the gap portion.

4. The rotor of the rotary electric machine according to claim 1, wherein in front view of the rotor core, when an angle between a third virtual line and the d-axis is set as $\theta 1$ and an angle between the first virtual line and the d-axis and an angle between the second virtual line and the d-axis are set as $\theta 2$, $\theta 1 < \theta 2$ is satisfied, the third virtual line connecting a central portion of the at least one of the arc magnets of the outer diameter side magnet portion and an arc center of the at least one of the arc magnets of the outer diameter side magnet portion.

5. The rotor of the rotary electric machine according to claim 4, wherein the at least one of the arc magnets of the outer diameter side magnet portion includes one arc magnet, and the $\theta 1$ is zero.

6. The rotor of the rotary electric machine according to claim 1, wherein:

each of the arc magnets has a same arc center on an inner peripheral surface and an outer peripheral surface;

a plate thickness of each of the arc magnets is larger in the inner diameter side magnet portion than in the outer diameter side magnet portion; and an arc radius of each of the arc magnets is larger at the inner diameter side magnet portion than at the outer diameter side magnet portion.

* * * * *